United States Patent
Ichtchenko

(10) Patent No.: US 9,708,014 B1
(45) Date of Patent: Jul. 18, 2017

(54) ADAPTABLE CARGO RACK SYSTEM

(71) Applicant: Igor Ichtchenko, Staten Island, NY (US)

(72) Inventor: Igor Ichtchenko, Staten Island, NY (US)

( * ) Notice: Subject to any disclaimer, the term of this patent is extended or adjusted under 35 U.S.C. 154(b) by 26 days.

(21) Appl. No.: 15/055,882

(22) Filed: Feb. 29, 2016

(51) Int. Cl.
*B62D 33/02* (2006.01)

(52) U.S. Cl.
CPC .................. *B62D 33/0207* (2013.01)

(58) Field of Classification Search
CPC ......... B62D 33/0207; B60R 9/00; B60R 9/06; B60R 9/045; B60P 3/40; B60P 3/14
USPC ........................................ 224/402, 403, 405
See application file for complete search history.

(56) References Cited

U.S. PATENT DOCUMENTS

| | | | | | |
|---|---|---|---|---|---|
| 3,217,449 | A * | 11/1965 | Levere | ....................... | E04G 1/06 182/178.6 |
| 4,211,448 | A * | 7/1980 | Weston | ..................... | B60R 9/00 224/325 |
| 4,405,170 | A * | 9/1983 | Raya | .......................... | B60P 3/42 224/309 |
| 5,108,141 | A * | 4/1992 | Anderson | ................. | B60R 9/00 211/182 |
| 5,431,472 | A * | 7/1995 | Coffland | ................... | B60R 9/00 224/403 |
| 5,439,152 | A * | 8/1995 | Campbell | ................. | B60R 9/00 108/55.1 |
| 5,516,020 | A * | 5/1996 | Lawler | ...................... | B60R 9/00 211/19 |
| 5,725,137 | A * | 3/1998 | Macdonald | .............. | B60R 9/00 211/206 |
| 5,836,635 | A * | 11/1998 | Dorman | .................... | B60R 9/00 224/405 |
| 6,186,571 | B1 * | 2/2001 | Burke | ....................... | B60P 3/40 224/405 |
| 6,513,849 | B2 * | 2/2003 | Carter | ...................... | B60R 9/00 224/310 |
| 6,554,170 | B1 * | 4/2003 | Correll | ................... | B63B 45/04 141/343 |
| 6,752,301 | B1 * | 6/2004 | Drolet | ...................... | B60P 3/40 224/403 |
| 6,834,902 | B2 * | 12/2004 | Agan | ........................ | B60P 3/40 224/405 |
| 7,104,429 | B1 * | 9/2006 | Flores | ...................... | B60R 9/00 211/207 |
| 7,641,251 | B1 * | 1/2010 | Stepanians | ................ | B60P 3/40 224/405 |

(Continued)

*Primary Examiner* — Peter Helvey
(74) *Attorney, Agent, or Firm* — Dunlap Bennett & Ludwig PLLC

(57) ABSTRACT

An adaptable cargo rack system that is easily transformable between a plurality of modes for carrying different kinds of items and performing different kinds of tasks is provided. The cargo rack system provides mounting brackets and poles that interconnect via identical universal connectors that do not require tools to interconnect and move between a locked position and an unlocked position. The cargo rack system also provides a plurality of rails that extend between posts. Accordingly, the same cargo rack system can be transformed between a first framework mode, a second framework mode and an elongated mode to carry items that are rectangular and planar, bulky and boxy, and elongated, respectively.

10 Claims, 6 Drawing Sheets

(56) References Cited

U.S. PATENT DOCUMENTS

| | | | | |
|---|---|---|---|---|
| 7,758,091 | B1* | 7/2010 | McCall | B60P 3/40 |
| | | | | 224/405 |
| 8,662,366 | B1* | 3/2014 | DeZonia | B60R 9/04 |
| | | | | 224/403 |
| 2002/0163214 | A1* | 11/2002 | Carter | B60R 9/00 |
| | | | | 296/3 |
| 2004/0262348 | A1* | 12/2004 | Green | B60R 9/00 |
| | | | | 224/405 |
| 2005/0023314 | A1* | 2/2005 | Williams | B60R 9/00 |
| | | | | 224/405 |
| 2009/0166390 | A1* | 7/2009 | Flaherty | B60P 3/40 |
| | | | | 224/405 |
| 2010/0072237 | A1* | 3/2010 | Green | B60R 9/00 |
| | | | | 224/405 |
| 2013/0026202 | A1* | 1/2013 | Williams | B60R 9/06 |
| | | | | 224/405 |
| 2014/0239025 | A1* | 8/2014 | Scott | B60P 3/40 |
| | | | | 224/405 |
| 2015/0258940 | A1* | 9/2015 | Breeden, III | B60R 9/045 |
| | | | | 224/405 |
| 2015/0353021 | A1* | 12/2015 | Orme | B60R 9/06 |
| | | | | 224/405 |

* cited by examiner

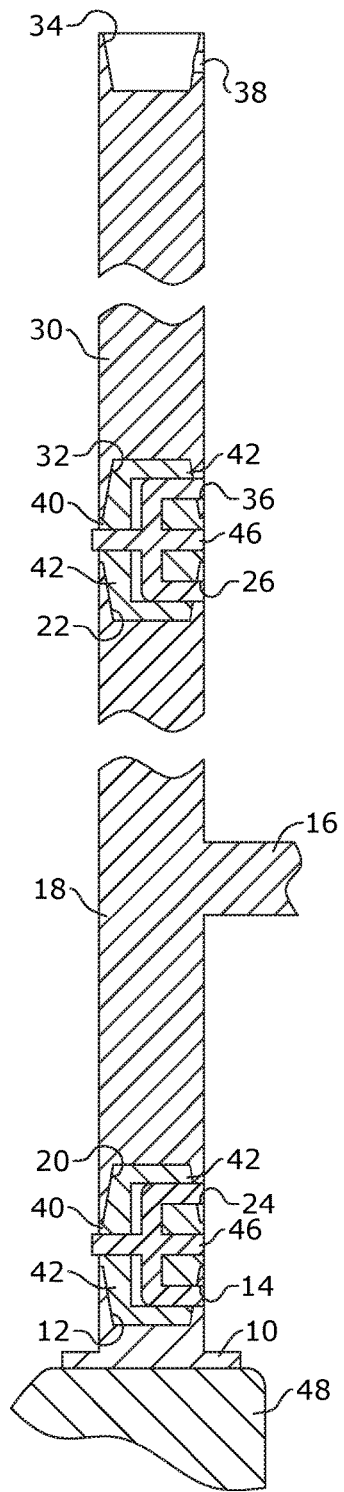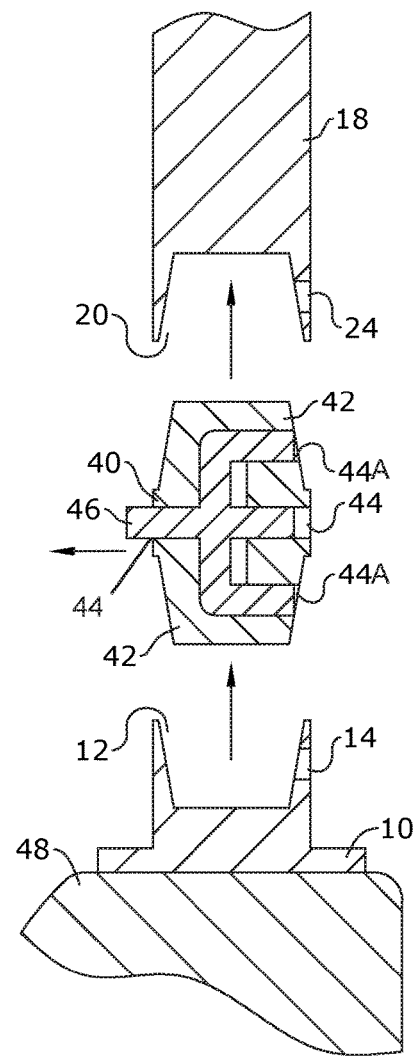
FIG.5
FIG.6

ADAPTABLE CARGO RACK SYSTEM

BACKGROUND OF THE INVENTION

The present invention relates to cargo racks and, more particularly, to an adaptable cargo rack that is easily transformable between a plurality of modes for carrying different kinds of items and performing different kinds of tasks, wherein the transformation between the plurality of modes does not require tools.

Delivering different kinds of materials and/or items via a vehicle usually requires different kinds of cargo racks: a first framework mode for heavy, rectangular planar items, such as drywall, plywood, etc.; an elongated framework mode for elongated items, such as ladders, pipes, etc.; and a second lattice framework mode for containing bulky items, such as cardboard boxes, bales of hay, garbage and the like.

Current vehicular cargo carrying systems are complex to put on and take off, requiring tools to manipulate, and do not transform between a significant plurality of modes. Furthermore, such systems require complicated assembly and installation, do not transform easily, and cannot be transformed into a second lattice framework mode.

As can be seen, there is a need for an adaptable cargo rack that is easily transformable between a plurality of modes for carrying different kinds of items and performing different kinds of tasks, wherein the transformation between the plurality of modes does not require tools.

SUMMARY OF THE INVENTION

In one aspect of the present invention, cargo rack system that is transformable between a plurality of modes without the use of tools includes a plurality of mounting brackets, each providing a sleeve, wherein each sleeve provides a tapered post slot; a plurality of posts, each post terminating in opposing tapered post slots; and a plurality of universal connectors, wherein each universal connector has two opposing tapered portions interconnected by a mid portion, a plurality of lock pin holes including two lock pin hole formed in each of the two tapered portions; one lock pin hole formed in the mid portion so that the plurality of lock pin holes communicate with each other; and a lock pin dimensioned and adapted so as to movable between an unlocked position, protruding through the lock pin hole of the mid portion, and a locked position, protruding through the two lock pin holes of the two tapered portions, wherein each tapered post slot forms a lock hole, and wherein each tapered post slot is dimensioned and adapted to snugly receive one of the two tapered portions so that the lock pin hole of the one of the two tapered portions aligns with the lock hole of the associated tapered post slot.

In another aspect of the present invention, the cargo rack system further includes a first additional pair of mounting brackets; a first additional rail extending between the first additional pair of mounting brackets so that the first additional rail is coplanar with the two second rails; two distal mounting brackets; two extendable posts, each extendable post interconnected to an associated distal mounting bracket of the two distal mounting brackets via one of the plurality of universal connectors; and a distal rail extending between the two extendable posts so that the distal rail is coplanar with the first additional rail.

These and other features, aspects and advantages of the present invention will become better understood with reference to the following drawings, description and claims.

BRIEF DESCRIPTION OF THE DRAWINGS

FIG. 5 is a section view of an exemplary embodiment of the present invention, taken along line 5-5 of FIG. 1;

FIG. 6 is a section view of an exemplary embodiment of the present invention, demonstrating an operation of a universal connector;

DETAILED DESCRIPTION OF THE INVENTION

Figure 1:
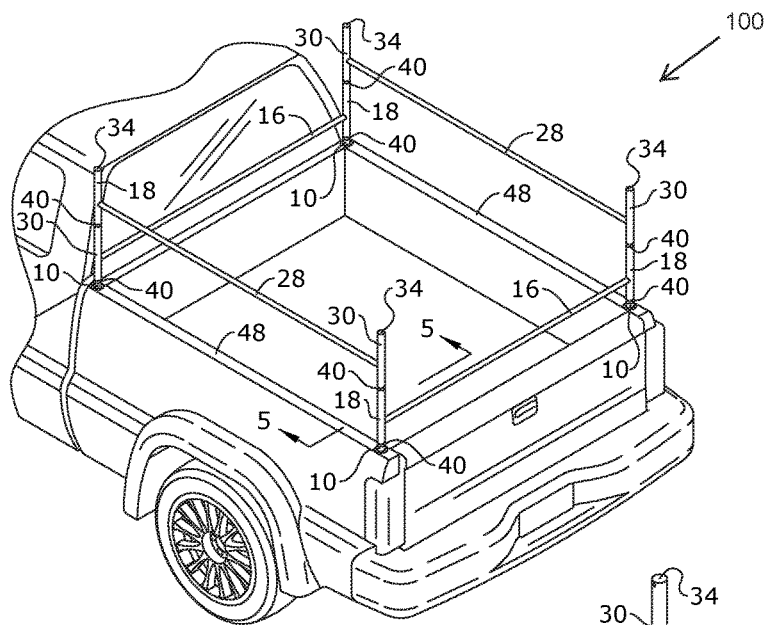
FIG. 1 is a perspective view of an exemplary embodiment of the present invention, shown in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an adaptable cargo rack system that is easily transformable between a plurality of modes for carrying different kinds of items and performing different kinds of tasks. The cargo rack system provides mounting brackets and poles that interconnect via identical universal connectors that do not require tools to interconnect and move between a locked position and an unlocked position. The cargo rack system also provides a plurality of rails that extend between posts. Accordingly, the same cargo rack system can be transformed between a first framework mode, a second framework mode and an elongated mode to carry items that are rectangular and planar, bulky and boxy, and elongated, respectively.

Referring to FIGS. 1 through 10, the present invention may include a cargo rack system 100 adapted to be mounted via a plurality of mounting brackets 10 to a supporting structure 48, wherein the supporting structure 48 may include but not be limited to portions of a vehicle, for example along truck bed rails. The mounting brackets 10 may be rigidly or removably attached to the supporting structure 48. In certain embodiments, the mounting brackets 10 may be welded, integrated, or clamped to the supporting structure 48.

Each mounting bracket 10 may provide a bracket slot 12 formed by a sleeve, wherein the sleeve provides a bracket lock hole 14 communicating to the bracket slot 12. Each bracket slot 12 may be dimensioned and adapted to removably secure a tapered portion 42 of a universal connector 40 snugly therein.

The universal connector 40 may provide a mid portion interconnecting two opposing tapered portions 42, wherein a connector pin hole 44 may be journaled through the mid portion. In certain embodiments, the universal connector 40 may provide two lock pin holes 44A, each lock pin hole 44A may communicate to a midpoint of the connector pin hole 44 and communicate to an outer surface of one of the two tapered portion 42, as illustrated in FIG. 6. The universal connector 40 may provide a lock pin 46 that is dimensioned and adapted be movable between a locked position, protruding from both lock pin holes 44A, and an unlocked position, protruding from an opposing lock pin hole 44. In the locked position, the portion of the lock pin 46 protruding from both lock pin holes 44A can operable engage the bracket lock hole 14 of the mounting bracket 10 and another lock hole of another member joined to the mounting bracket 10, or similarly interconnect two other such members, as illustrated in FIG. 5.

Such other members may be a first post 18 or a second post 30, wherein each such post terminates in opposing post slots 20, 22 and 32, 34, respectively, and wherein each such post slots may be dimensioned and adapted to removably secure the tapered portion 42, and wherein each post, 18, 30 provides a plurality of post lock hole 24, 26 and 36, 38 for each post slot 20, 22 and 32, 34, respectively, for receiving the lock pin 46 in a locking engagement in the locked position. The plurality of post lock hole 24, 26 and 36, 38 may be orthogonally disposed so that a user may orient the lock pin in at least one of four orthogonally-varied orientations. In certain embodiments, the cargo rack system 100 may also include two extendable posts 58, each providing similar opposing post slots and post lock holes.

The cargo rack system 100 may include at least one first rail 16 extending between so as to perpendicularly and removably interconnect two first posts 18. The cargo rack system 100 may include at least one second rail 28 extending between so as to perpendicularly and removably interconnect two second posts 30. Each rail 16, 28 may include two telescopically connecting rail portions 50 and 52. In an alternative embodiment, the rail may be a low profile rail 54 dimensioned and adapted to perpendicularly interconnect two short posts 56. It should be appreciated that the rails 16 and 28 may be oriented in various relationships relative to each other.

Figure 2:
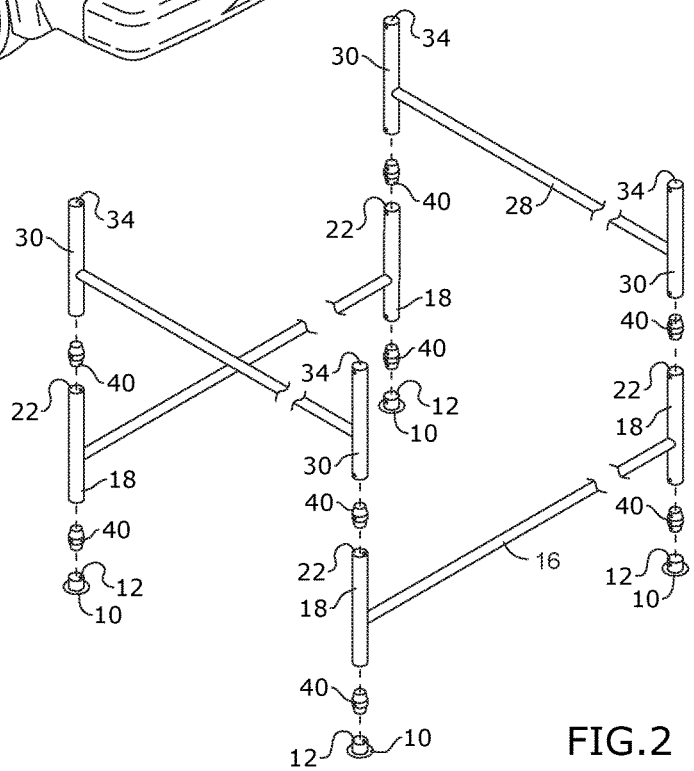
FIG. 2 is an exploded view of an exemplary embodiment of the present invention.
Figure 3:
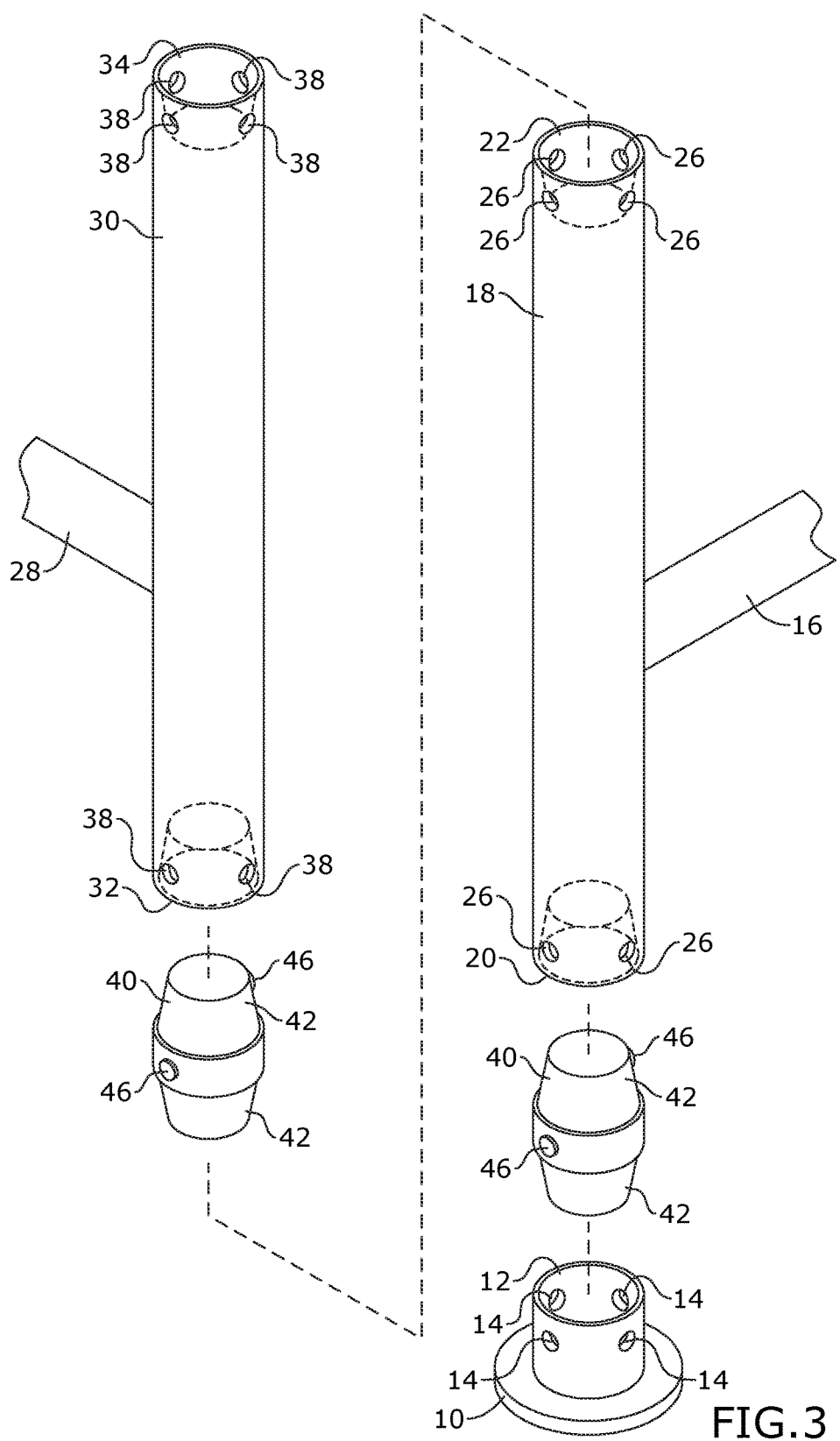
FIG. 3 is a detailed front exploded view of an exemplary embodiment of the present invention.
Figure 4:
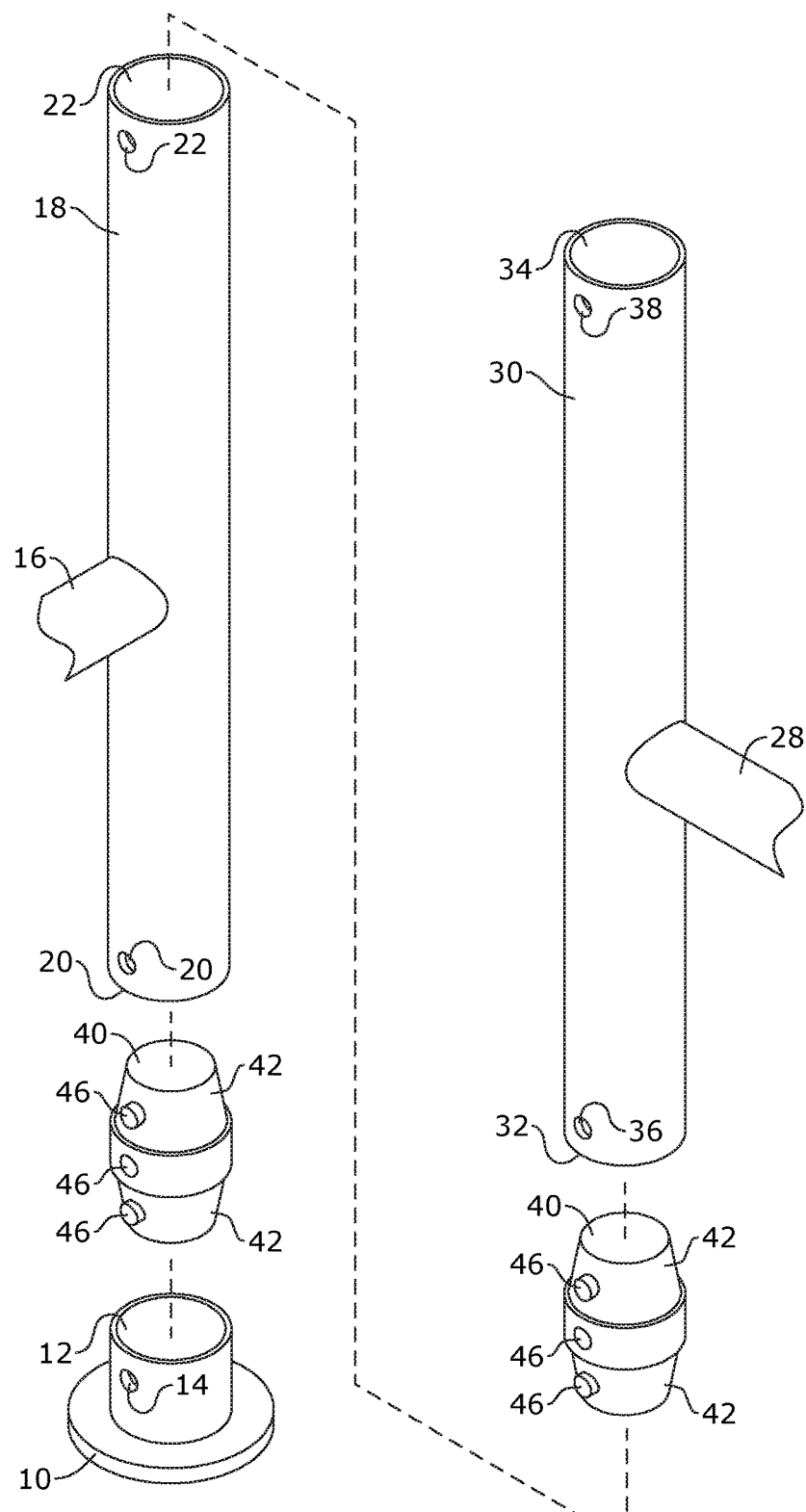
FIG. 4 is a detailed rear exploded view of an exemplary embodiment of the present invention.

In certain embodiments, there may be four mounting brackets 10 spaced apart along the supporting structure 48 in an orthogonal relationship with each other. As a result, when first posts 18 are detachably joined to each mounting bracket 10 via the universal connectors 40, the resulting four first posts 18 and the at least one first rail 16 form a first lattice framework, as illustrated in FIG. 2. Similarly joining, via additional universal connectors 40, four second posts 30 vertically upward of the first posts 18, wherein the at least one second rail 28 is orthogonal to the at least one first rail 16, adds a second lattice framework orthogonal to the first lattice framework. Accordingly the cargo rack system 100 is transformable between the first lattice framework and the second lattice framework.

Figure 7:
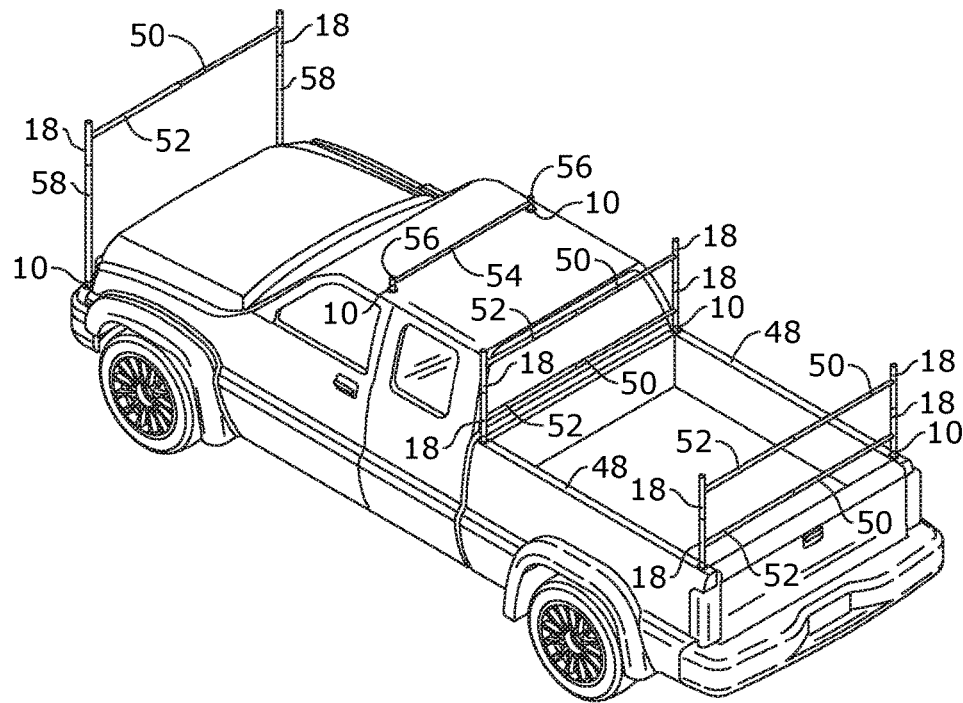
FIG. 7 is a perspective view of an exemplary embodiment of the present invention, shown in use.
Figure 8:
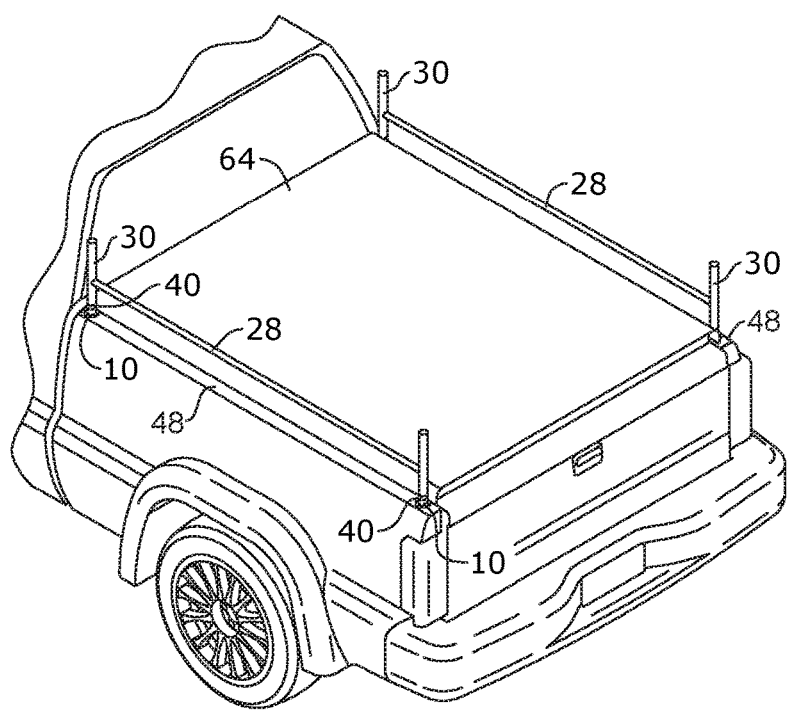
FIG. 8 is a perspective view of an exemplary embodiment of a cover element of the present invention, shown in use.

Such configurations result in a first framework mode and a second framework mode, respectively, wherein the second framework mode, enables, in effect, sidewalls provided by the second and/or first rails 28 and/or 16, or, alternatively, wherein the at least one first rail 16 and the at least one second rail 28 may be oriented parallel to each other, a built up framework mode having built-up front and back walls, as illustrated in FIG. 7.

The cargo rack system 100 may provide an elongated framework mode by adding to the built up framework mode at least one additional pair of mounting brackets 10 and associated posts and rail, so that at least one rail from each of the at least one additional pair of mounting brackets 10 and the built up framework mode are generally parallel and co-planar, as illustrated in FIG. 7.

Figure 9:
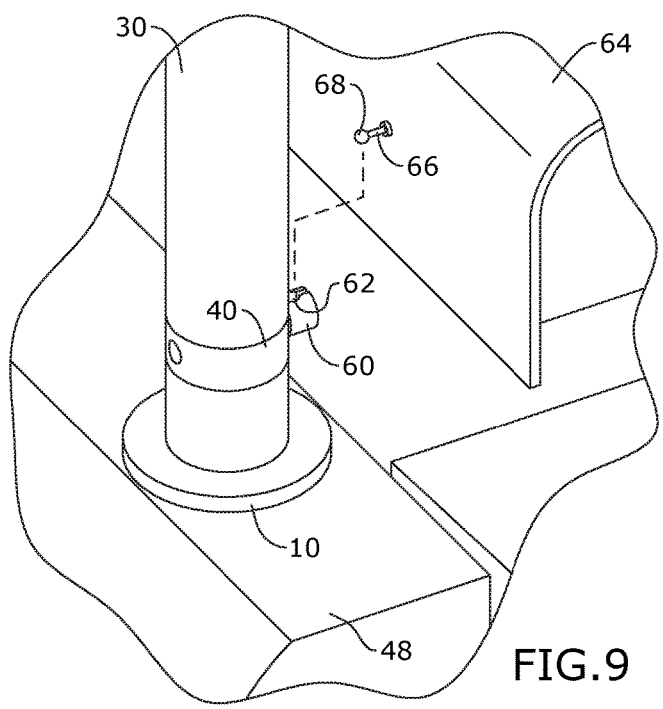
FIG. 9 is a detailed exploded view of an exemplary embodiment of the present invention, demonstrating the removable securing of the cover element.
Figure 10:
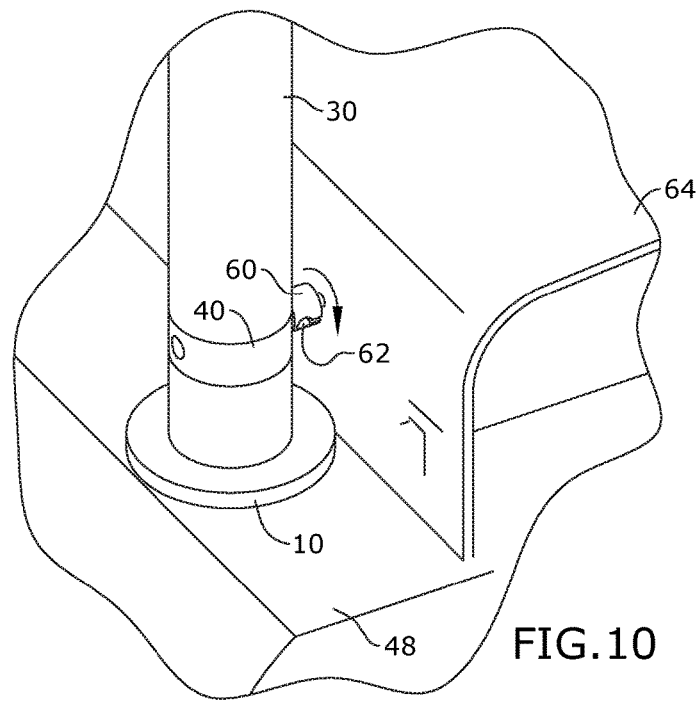
FIG. 10 detailed perspective view of an exemplary embodiment of the present invention, demonstrating the cover element moving from an unlocked configuration to a locked configuration.

The cargo rack system 100 may provide a cover element 64 providing a plurality of cover element posts 66, each cover element connector 66 terminating in a connector ball 68, as illustrated in FIG. 9. The cover element posts 66 may be spaced to engage a lattice framework, wherein each post of such lattice framework provides a cover element attachment 60 dimensioned and adapted to removably secure the cover element connector 66 in a locked engagement, as illustrated in FIG. 10. Each cover element attachment 60 has a cover element slot 62 for slidably receiving the connector ball 68, and wherein each cover element attachment 60 is rotatable between a locked configuration and an unlocked configuration, as illustrated in FIG. 10. Since the cover element attachment 60 can rotate 360 degrees, and the locked configuration is only a small fraction of the 360 degrees, the unlocked configuration may be maintained in many directions relative to each associated post. As a result, the cover element 64 may be engaged and disengaged in many direction relative to the lattice framework, including positioning, opening and removing the cover element 64 to the right, left, front, rear and so on, enabling multiple degrees of freedom for the cover element 64 during its use.

The cover element 64 may be attached to the first lattice framework or elevated and attached to the second lattice framework, the built up framework or the extendable poles 58 vertically joined to one of these frameworks so as to provide, in effect, a movable roof or platform system for sheltering or supporting various equipment at different elevations. Note the cargo rack system can be removed from one supporting structure 48, say a vehicle, to another supporting structure 48, say the ground, thereby providing a portable shelter. The cover element 64 may provide peripheral sidewalls, and as a result, in certain embodiments, the cover element 64 may be attached to a framework mode so that the peripheral sidewalls were upward-facing and so the cover elements 64 may define a compartment space for storing items and materials.

The components of the cargo rack system 100 may be made of material that can be repeatedly bent without fracturing, such as various impregnated or laminated fibrous materials, various plasticized materials and the like.

A method of using the present invention may include the following. The cargo rack system 100 may be provided. A user may have the necessary mounting brackets 10 installed onto the supporting structure 48 to assembly the first, second, and built up framework modes and the elongated framework mode. When needed the user can assembly the first framework mode, from which adding simple elements may lead to dramatic improvement of the system's capabilities. For example, adding planks that span between two coplanar first rails 16 and/or tow coplanar second rails 28 would form scaffolding—and if the supporting structure 48 was a vehicle, the scaffolding would be a mobile scaffolding system.

The user may transform the cargo rack system 100 between a plurality of modes for carrying different kinds of items and performing different kinds of tasks, without using tools, but by rather using the universal connectors 40 to interconnect the posts and mounting brackets and posts with rails into different frameworks. The first framework mode may be used for heavy, rectangular planar items, such as drywall and plywood. The elongated framework mode may be used for supporting elongated items and equipment, such as ladders, pipes, and the like. The second lattice framework mode may be used, with the two second rails 28 acting as opposing sidewalls, to carry bulky items, such as cardboard boxes, bales of hay, garbage and the like. The user may employ straps (not shown), such as ratcheting straps, to secure such items to portions of any of the frameworks.

It should be understood, of course, that the foregoing relates to exemplary embodiments of the invention and that modifications may be made without departing from the spirit and scope of the invention as set forth in the following claims.

What is claimed is:

1. A cargo rack system that is transformable between a plurality of modes without the use of tools, comprising:
    a plurality of mounting brackets, each providing a sleeve, wherein each sleeve provides a tapered post slot;
    a plurality of posts, each post terminating in opposing tapered post slots; and
    a plurality of universal connectors, wherein each universal connector comprises:
        two opposing tapered portions interconnected by a mid portion,
        a plurality of lock pin holes comprising:
            two lock pin hole formed in each of the two tapered portions;
            one lock pin hole formed in the mid portion so that the plurality of lock pin holes communicate with each other; and
        a lock pin dimensioned and adapted so as to movable between an unlocked position, protruding through the lock pin hole of the mid portion, and a locked position, protruding through the two lock pin holes of the two tapered portions,
    wherein each tapered post slot forms a lock hole, and wherein each tapered post slot is dimensioned and adapted to snugly receive one of the two tapered portions so that the lock pin hole of the one of the two tapered portions aligns with the lock hole of the associated tapered post slot.

2. The cargo rack system of claim 1, further comprising a plurality of rails, each rail extending between pairs of the plurality of posts.

3. The cargo rack system of claim 2, wherein each rail of the plurality of rails comprises two telescopically connecting rail portions.

4. The cargo rack system of claim 2, wherein the plurality of mounting brackets comprise four mounting brackets, wherein the plurality of posts comprise four first posts, and wherein each of the four first posts is interconnected to an associated mounting bracket of the four mounting brackets via one of the plurality of universal connectors.

5. The cargo rack system of claim 4, wherein the plurality of rails comprises two first rails extending parallel to each other between two pairs of the four first posts.

6. The cargo rack system of claim 5, wherein the plurality of posts further comprise four second posts, and wherein each of the four second posts is interconnected to an associated first post of the four first posts via one of the plurality of universal connectors.

7. The cargo rack system of claim 6, wherein the plurality of rails comprises two second rails extending parallel to each other and parallel to the two first rails as each second rail extends between two pairs of the four second posts.

8. The cargo rack system of claim 6, wherein the plurality of rails comprises two second rails extending parallel to each other and orthogonal to the two first rails as each second rail extends between two pairs of the four second posts.

9. The cargo rack system of claim 7, further comprising:
    a first additional pair of mounting brackets; and
    a first additional rail extending between the first additional pair of mounting brackets so that the first additional rail is coplanar with the two second rails.

10. The cargo rack system of claim 9, further comprising:
    two distal mounting brackets;
    two extendable posts, each extendable post interconnected to an associated distal mounting bracket of the two distal mounting brackets via one of the plurality of universal connectors; and
    a distal rail extending between the two extendable posts so that the distal rail is coplanar with the first additional rail.

* * * * *